United States Patent [19]

Masuzawa et al.

[11] Patent Number: 5,097,709
[45] Date of Patent: Mar. 24, 1992

[54] ULTRASONIC IMAGING SYSTEM

[75] Inventors: Hiroshi Masuzawa, Kokubunji; Hiroshi Takeuchi, Matsudo; Chitose Nakaya, Tokyo, all of Japan

[73] Assignee: Hitachi, Ltd., Tokyo, Japan

[21] Appl. No.: 479,172

[22] Filed: Feb. 13, 1990

[30] Foreign Application Priority Data

Feb. 16, 1989 [JP] Japan ................................ 1-037214

[51] Int. Cl.⁵ ............................................. G01N 29/26
[52] U.S. Cl. .................................. 73/626; 128/661.01; 310/334
[58] Field of Search .................... 128/661.01; 310/334, 310/335; 73/626, 625, 610, 632

[56] References Cited

U.S. PATENT DOCUMENTS

| | | | |
|---|---|---|---|
| 4,112,411 | 9/1978 | Alais et al. | 73/626 |
| 4,224,829 | 9/1980 | Kawabachi et al. | 73/626 |
| 4,324,142 | 4/1982 | Auphan et al. | 73/626 |
| 4,437,033 | 3/1984 | Diepers | 310/334 |
| 4,480,075 | 5/1984 | Takemura et al. | 73/626 |
| 4,550,606 | 11/1985 | Drost | 73/626 |
| 4,712,037 | 12/1987 | Verbeek et al. | 310/334 |
| 4,736,631 | 4/1988 | Takeuchi et al. | 73/649 |
| 4,945,915 | 8/1990 | Nagasaki | 73/626 |

Primary Examiner—Hezron E. Williams
Assistant Examiner—Rose M. Finley
Attorney, Agent, or Firm—Antonelli, Terry, Stout & Kraus

[57] ABSTRACT

An ultrasonic measuring system including a transducer having a plurality of row electrodes on one surface thereof and a plurality of column electrodes crossing the plurality of row electrodes on the other surface thereof and made of an electrostrictive material in which piezoelectricity is induced by a bias electric field applied thereto to thereby obtain sectional images sequentially. A row position selector is connected to the row electrodes to select several row electrodes and apply a direct current bias voltage to the selected electrode and to shift the position of the selection sequentially. An electronic B-mode image scanner is connected to the column electrodes to shift the directivity of the transmission/reception ultrasound beams sequentially widthwise of the column electrodes (in the direction of row extension) to obtain echo signals indicative of an acoustic reflective response. An acoustic lens may be provided over the entire surface of the transducer so as to be moved synchronously with selection of the row electrodes by the row position selector.

9 Claims, 5 Drawing Sheets

FIG. 2
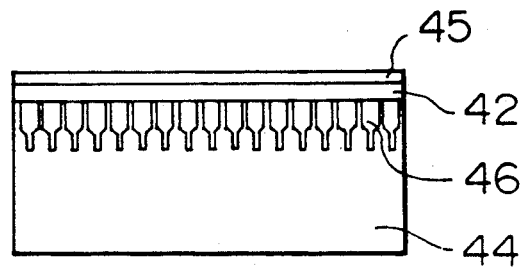
FIG. 3B
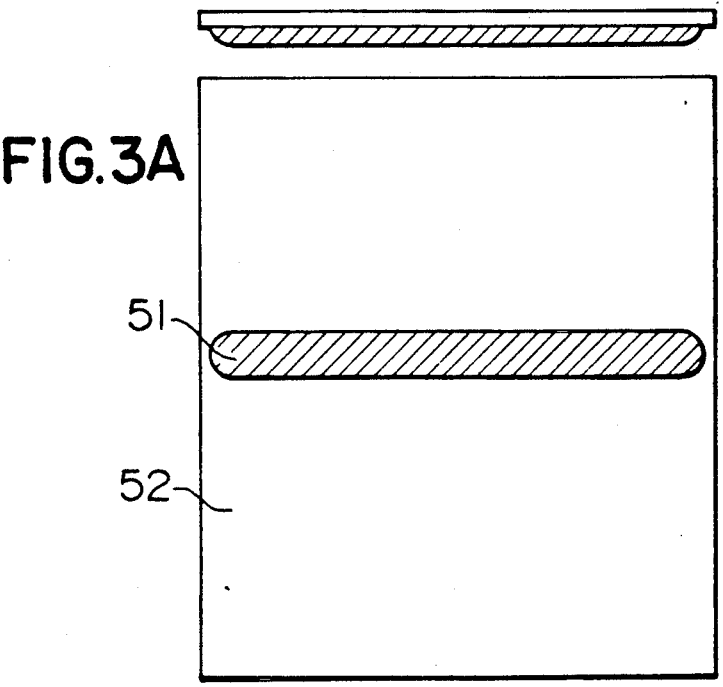
FIG. 3A
FIG. 3C

ULTRASONIC IMAGING SYSTEM

BACKGROUND OF THE INVENTION

The present invention relates to electronical scanning type medical ultrasonic imaging systems and more particularly to ultrasonic probes used in such measuring systems.

Current typical medical ultrasonic imaging systems obtain a sectional image of a human body using a ultrasonotomograph in B-mode display on a real-time basis. In the actual diagnosis, the diagnostician continuously alters the direction of a probe to obtain an image of a body region of interest to thereby presume the internal structure and tissue of the body. However, according to this method, it is difficult to intuitively know the position of the internal sectional area of the body as well as to obtain the sectional image of the same region with high reproducibility. In order to obtain the sectional image of a body region of interest, the diagnostician may press the body of the patient for a long time to thereby give an uncomfortable feeling to him or her. A diagnostic device is being demanded which is capable of continuously obtaining a plurality of sectional images of different regions of a human body to thereby permit easy presumption of a three-dimensional structure and tissue of the body.

In such device, it is necessary to control the directivity of ultrasonic waves in a two-dimensional direction in the transmission/reception. To this end, the use of an ultrasonic probe which comprises transducer elements in a two-dimensional array and separate signal lines connected to the corresponding elements is required. However, according to this system, as the number of transducer elements increases, the connection of signal lines becomes difficult, so that it is very difficult to manufacture, in a mass production basis, probes where the characteristics of the respective elements are constant.

U.S. Pat. Nos. 4,448,075 and 4,736,631 disclose an array type ultrasonic probe which is capable of altering its transverse aperture against electronical scanning direction. Such probe is composed of driving electrodes spatially arranged in parallel on one surface of a transducer plate and grounding electrodes spatially arranged in parallel on the other surface of the plate. The electrodes are disposed spatially intersecting so as to be orthogonal to each other. By the selection of a driving electrode, an ultrasonic beam is scanned and, by the selection of a grounding electrode, the width of a transducer aperture perpendicular to the scanning direction is changed. Thus, a single B-mode sectional image is obtained to thereby improve the directivity of the ultrasonic beam normal to the cross section over a wide depth range Especially, in U.S. Pat. No. 4,736,631, the probe utilizes an electrostrictive material which piezoelectricity is induced by a bias voltage. A bias voltage is applied to a selected matrix position to thereby prevent the occurrence of electroacoustic conversion at a non-selected matrix position by an electric field distribution through the non-selected electrodes. Thus, the control of the directivity of the acoustic beam perpendicular to the scanning direction is effected more accurately.

SUMMARY OF THE INVENTION

It is an object of the present invention to provide an ultrasonic imaging system which is capable of obtaining a plurality of sectional images of regions at different positions in a short time without moving the probe, which has a reduced number of signal lines from the ultrasonic transducer, and which achieves easy connection of the signal lines.

It is another object of the present invention to provide an ultrasonic imaging system in which all the plurality of sectional images have a high resolution.

An imaging system according to the present invention is characterized in that an ultrasonic transducer is used which comprises a first plurality of line electrodes, a second plurality of line electrodes crossing the first plurality of line electrodes and a transducer plate of an electrostrictive material disposed between the first and second pluralities of line electrodes to cause a piezoelectric phenomenon in the transducer plate by a bias field applied to the transducer plate. A bias voltage is applied simultaneously to adjacent selected ones of the first plurality of line electrodes. A position selector is connected to the first plurality of line electrodes to shift the position of selected adjacent electrodes periodically. An electronical scanning means which is capable of obtaining B-mode images is connected to the second plurality of line electrodes. The means may apply the linear electronical scanning process which comprises actuating the devided transducer blocks successively to thereby scan a focused ultrasonic beam widthwise in the second plurality of line electrodes linearly or may apply the sector electronical scanning process which comprises actuating the divided transducer blocks in successively delayed timing to thereby scan the steered ultrasonic beam in the sector form. By such arrangement, data indicative of a plurality of B-mode images corresponding to the positions of adjacent electrodes selected by the position selector among first line electrodes are obtained successively. These data are stored in a signal storage means having a plurality of storage locations corresponding to the respective selected positions. Therefore, data are obtained which are indicative of a plurality of sectional images in a short time without changing the direction of the ultrasonic probe.

Another feature of the present invention is characterized by an acoustic lens which covers the whole width of the first plurality of line electrodes selected simultaneously by the position selector and which focuses the ultrasonic beam widthwise of the first plurality of line electrodes, and means for moving the acoustic lens synchronously with a shift of the position of adjacent line electrodes selected by the position selector.

Other features of the present invention will be apparent from the description of embodiments of the present invention taken in conjunction with the drawings.

BRIEF DESCRIPTION OF THE DRAWINGS

FIG. 2 is a side view of a transducer in the embodiment;

FIGS. 3A-3C show a front top and side view of an acoustic lens in the embodiment;

DETAILED DESCRIPTION OF THE PREFERRED EMBODIMENTS

Figure 1:
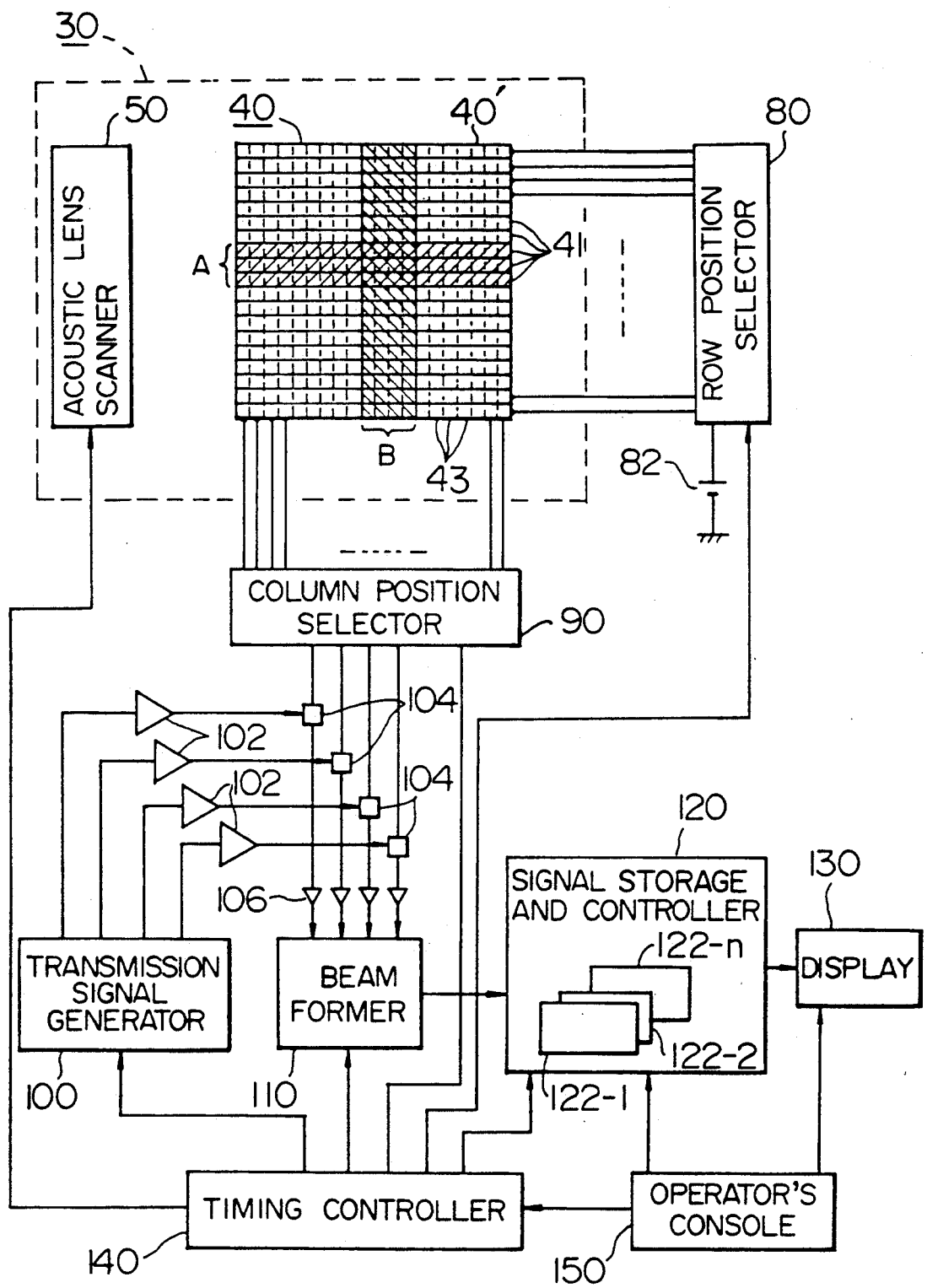
FIG. 1 is a block diagram indicative of the overall structure of one embodiment of the present invention.

FIG. 1 illustrates the entire structure of a medical ultrasonic imaging system as an embodiment of the present invention. A probe 30 which is put on a human body includes a transducer 40 and an acoustic lens scanner 50. The transducer 40 has a rectangular transducer plate 40' on one surface of which a plurality of line electrodes 41 (referred to as row electrodes) are arranged and on the other surface of which a plurality of line electrodes 43 (referred to as column electrodes) crossing the row electrodes are arranged.

FIG. 2 is a side view of the transducer 40 whose plate 42 is composed of an electrostrictive ceramic material, for example, of a ferroelectric relaxor whose paraelectric-ferroelectric transition temperature is observed in the vicinity of room temperature. A typical material is a Pb $(Mgl_{/3}Nb_{2/3})$ $O_3$—$PbTiO_3$ solid solution system. Therefore, when used in the vicinity of room temperature, the transducer plate 42 induces piezoelectricity by its polarization only when a bias electric field is applied enough across the transducer plate. The thickness of the transducer plate 42 is decided such that the resonant frequency through the thickness of the transducer plate coincides with the frequency of an ultrasonic wave transmitted or received. The row and column electrodes 41 and 43 are formed by baking a precious metal such as silver, plating copper or the like or depositing any suitable metal on both of the surfaces of the transducer plate 42. The transducer plate 42 where the electrodes are formed are joined to a backing member 44, for example, made of an epoxy resin and ferrite powder dispersed therein. Formed on the upper surface of the plate 42 is a first acoustic matching layer 45 the thickness of which is determined to be ¼ of the wavelength of the ultrasonic wave propagating therethrough. The backing member 44 has on its side terminals 46 which are electrically connected to the corresponding column electrodes and to which signal lines are connected. The transducer which includes such row and column electrodes is easy for signal lines to electrically connect because connection of the signal lines at the end of the matrix is required only.

Returning to FIG. 1, the electronic B-mode image scanning means includes a column position selector 90, a transmission signal generator 100, a beam former 110 and a timing controller 140 which generates a timing control signal to these elements. The transmission signal generator 100 generates transmission signals of a pulsed wave periodically for a corresponding plurality of channels. The delay times at which pulses are generated for the corresponding channels vary slightly from channel to channel to thereby realize the focusing of a transmission beam. These transmission signals are amplified by amplifiers 102 and applied to the column electrodes selected by the column position selector 90 via the corresponding signal couplers 104. The reception signals from the column electrodes selected by the selector 90 are delivered via corresponding signal couplers 104 and reception amplifiers 106 to the beam former 110. The beam former 110 repeats signal processing which gives delay times to the reception signals for the channels and adds up the signals conforming to a focused echo signal from a predetermined reflective source. The column position selector 90 performs a scanning operation referred to as electronic linear scanning. In a typical example, a predetermined number of adjacent column electrodes are selected at all times while being shifted one by one for each repetition of wave transmission. Namely, a selected region, shown by B in FIG. 1, is shifted in the direction of row extension, namely, widthwise of the column, for each repetition of wave transmission to thereby scan the central position of the transmission and reception beams in the direction of row extension.

The row position selector 80 selects a plurality of adjacent row electrodes and applies a bias voltage from a voltage source 82 to those selected electrodes. The remaining row electrodes which are nonselected electrodes are placed at a ground level. The selector 80 is controlled by the timing controller 140 so as to shift the position of the selected row electrodes one by one each time cyclic transverse scanning by the column position selector 90 is completed. Namely, the region shown by A in FIG. 1 where the bias voltage is applied is shifted in the direction of column extension each time the scanning of the B region in the direction of row extension is completed.

By such scanning, echo signals indicative of B-mode images at a plurality of different positions are obtained sequentially from the beam former 110. A bias field is applied to a transducer plate portion which exists in a region where the column electrodes selected by the column position selector 90 and connected to corresponding signal couplers 104 and amplifiers 106 and the row electrodes selected by the line position selector 80 and impressed with a bias voltage intersect to thereby induce a piezoelectricity in that region and hence to perform electro-acoustic conversion. The remaining region of the transducer will not be a source of ultrasound even if it is impressed with a transmission signal nor generate a piezoelectric voltage even if it is subjected to reflective waves. Therefore, a reception signal which indicates one B-mode image is obtained while the region selected by the row position selector 80 is fixed and the transmission and reception beams are scanned in the direction of row extension due to a cyclic shift of region selection by the column position selector 90. The scanning is repeated each time the position selected by the row position selector 80 is shifted, and a plurality of parallel B-mode sectional image are obtained sequentially.

A signal storage and controller 120 includes n storage areas 122-1, 122-2, .., 122-n corresponding to the number of positions selected by the row position selector 80 for storing the respective reception signals indicative of position B-mode echograms in assigned storage areas. The linear electronic scanning by the column position selector 90 and shifting of the sectional position by the row position selector 80 are repeated and the contents of the respective storage areas are updated each time the corresponding data are obtained. An operator's console 150 is capable of designating a desired one of a plurality of B-mode images. The signal storage and controller 120 reads data stored in the storage area and indicative of the B-mode image for the designated position and delivers it to a display 130 to thereby allow the desired position B-mode image to be observed. The operator's console 150 is also capable of stopping at any position at its command the movement of the position where the row position selector 80 applies a bias voltage to thereby continue to apply the bias voltage to that desired fixed position. In such section position fixed mode, the period at which the corresponding data in the storage area is updated becomes the period of electronic linear scanning by the column position selector 90, so that the sectional image can be observed on a real-time basis.

It may be arranged that when the operator's console 150 designates a sectional position fixed mode, the row position selector 80 continues to apply a bias voltage to a predetermined number of row electrodes positioned at the center of the transducer 40. According to such arrangement, the execution of the scanning cycle is facilitated in which the sectional image is observed in the sectional position fixed mode while ascertaining the central position of a target portion of the human body and in which the operator's console 150 designates a sectional position shift mode (a sequential shift of the selected position in the row electrodes mentioned above) and data on sectional images are recorded.

Preferably, the signal storage and controller 120 converts the received signals to corresponding digital signals of a predetermined point in cross-section and stores the digital signals.

The scanning by the column position selector 90 or the linear beam scanning through the section is not limited to the above embodiment. For example, the central position of an acoustic beam is shiftable at a pitch smaller than one pitch of the column electrodes by a shift depending on the number of selected column electrodes or by a shift depending on the number of selected column electrodes which differs depending on the transmission waves or reception of ultrasound. A high resolution B-mode image is obtained over a wide depth range by multi-focusing which includes transmitting and receiving ultrasound at focal distances varying depending on the corresponding areas into which a signal area for one B-mode image is divided in the direction of depth.

The above-mentioned focusing is performed in the direction of linear electronic scanning of one sectional image or in the row direction. Focusing of an acoustic beam in the direction perpendicular to the plane of the sectional image is realized using an acoustic lens the position of which coincides with the position of row electrodes to which a bias voltage is selectively applied by the row position selector 80. Therefore, the acoustic lens is moved synchronously with the scanning of the position selection by the row selector 80. As shown in FIGS. 3A-3C, a semi-circular-sectional rib 51 which acts as the acoustic lens is attached to a sheet 52 and has width slightly larger than the whole width of the row electrodes selected simultaneously. The sheet 52 also has the function of a second acoustic matching layer which has a thickness determined to be ¼ of the wavelength of an ultrasonic propagated therethrough.

Figure 4:
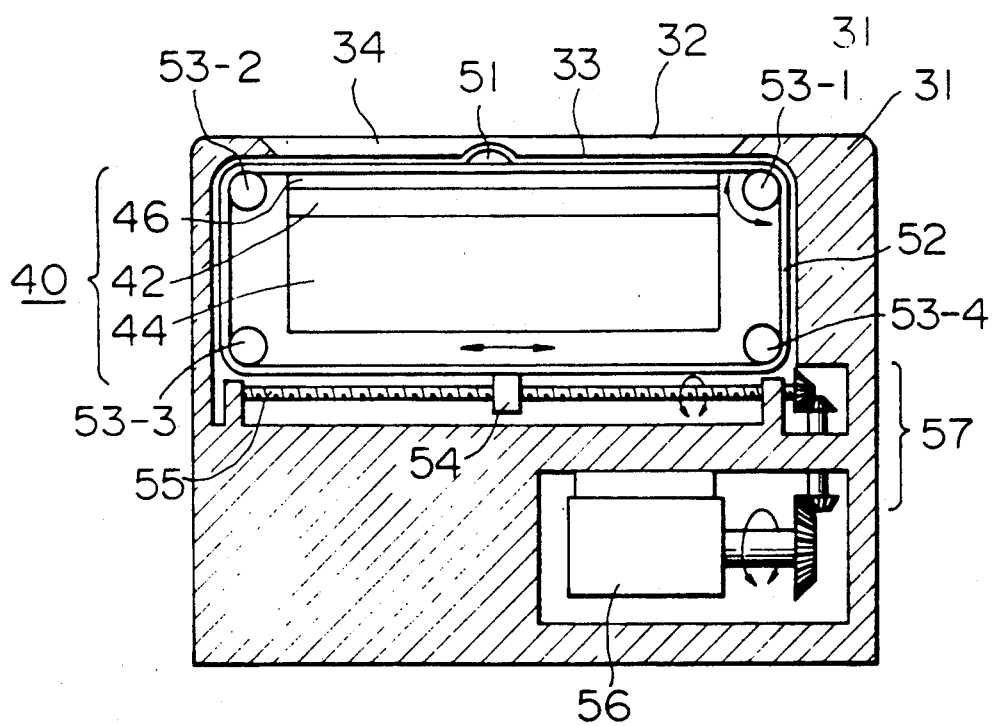
FIG. 4 is a partial cross-sectional view of a probe in which the transducer and acoustic lens are incorporated.

FIG. 4 illustrates a partial cross section of the probe 30 in which the acoustic lens and acoustic lens scanner 50 are mounted. A frame 31 has in its inner cavity four rollers 53-1, 53-2, 53-3 and 53-4. The sheet 52 is attached in the form of a ring so as to extend along those rollers. A window is provided in the front of the frame 31 to allow ultrasonic waves to pass therethrough. Double flexible resin films 32 and 33 extend through the window and an acoustic wave transmission liquid, for example, of water, is filled between the films 32 and 33. The rib 51 attached to the sheet 52 is disposed inside the window, and the transducer 40 is disposed also inside the sheet 52. The sheet 52 and rib 51 contact the film 33 inside the window while the surface of the transducer 40 or the surface of the first acoustic matching layer 45 contacts the sheet 52. The rotation of a step motor 56 is transmitted to a shaft 55 with a helical groove via a gear 57. A member 54 is fitted to the shaft 55 and fixed to the sheet 52 to translate the rib 51 as the acoustic lens by rotation of the sheet 52 due to rotation of the step motor 56.

In the above embodiment, the bias voltage applied to the selected row electrodes are maintained constant during the transmission and reception of ultrasound used for picking up a B-mode image to thereby maintain the electro-acoustic conversion efficiency of the transducer constant and the transmission/reception sensitivity unchanged.

While in the above embodiment the pickup of each B-mode image is realized using linear scanning or a method of moving the position of an acoustic beam by a shift of a transmitting and/or receiving aperture of the transducer, it may be realized by the sector scanning which alters the direction of deflection of an acoustic beam with the position of the transmitting and/or receiving aperture being fixed. In the case of the sector scanning, the transmission wave signal generator 100 is capable of selecting moments at which transmission signals having corresponding patterns are generated while the beam former 110 is capable of selecting delay time distributions having corresponding patterns. Each time the transmission/reception of ultrasound are repeated, the respective moments and delay time distributions having sequentially different patterns are selected to thereby scan over the beam azimuth. In any case, an electronic B-mode image scanning means in which at least part of the column electrodes 42 is used and transmission/reception responsive signals are obtained sequentially by moving the directivity of an ultrasonic beam sequentially along the direction of row extension is required to be connected to the column electrodes of the transducer 40.

Figure 5C:
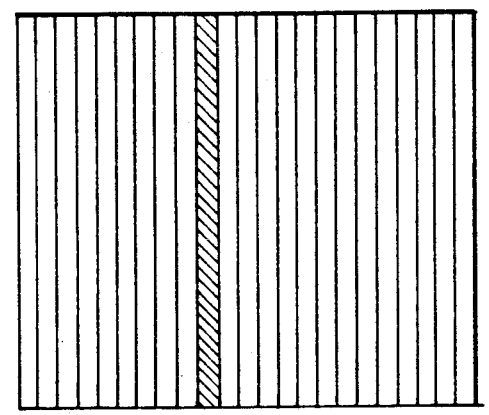
FIGS. 5A, 5B and 5C are a plan view of illustrative electrodes selected in the embodiment.
Figure 5B:
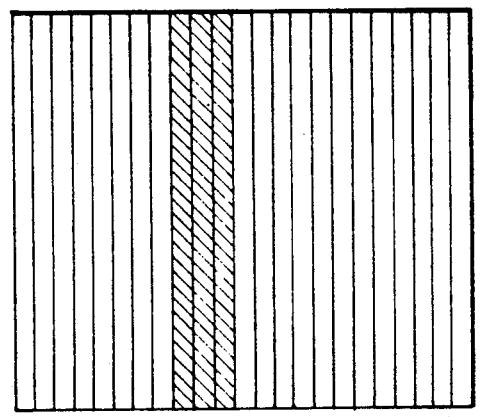
Figure 5A:
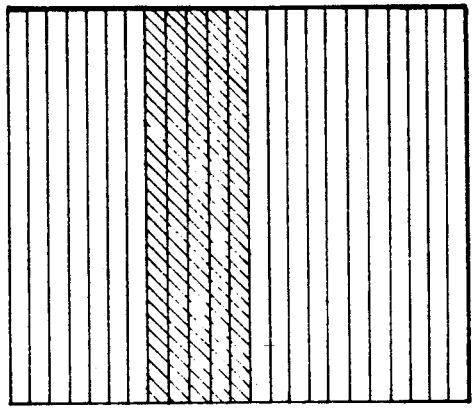

If the above mentioned multi-focusing is performed by any of the linear scanning and sector scanning, the control of the directivity of an ultrasonic beam in the direction of column extension is preferably performed in parallel with the alternation of the focal distance in the focusing in the electronic scanning direction (in the direction of row extension). The control of the directivity is achieved by changing the number of row electrodes selected by the row position selector 80 during the time when the central position of the selected row electrodes is constant or by changing the width of the area to which the bias voltage is applied. FIG. 5A illustrates by hatching an area selected by the row position selector 80 when focusing in a near distance in the direction of row extension is performed and a reception signal from a near-distance area is recorded by the moments when pulses are generated from the transmission signal generator 100 and the delay time distribution from the beam former 110. Similarly, FIG. 5B illustrates an area selected by the row position selector 80 when focusing in a medium distance in the direction of row extension is performed and a reception signal from the medium-distance area is recorded. FIG. 5C illustrates an area selected by the row position selector 80 when focusing in a far distance in the direction of row extension is performed and a reception signal from the far area is recorded. The acoustic lens used has a size to sufficiently cover the maximum selected area of FIG. 5C. As shown, as the focal distance in the focusing in the direction of row extension is short, the width of the area to which the bias voltage is applied is reduced to thereby appropriately control the directivity of the acoustic beam in the direction of column extension as the case may be. According to the selection is FIG. 5A, the directivity of the near field is increased compared to the selection in FIGS. 5B and 5C. According to the selection of FIG. 5C, the directivity of the far field is increased compared to that of FIG. 5A and 5C. Therefore, the focal distance of the beam in the direction of column extension is changed effectively by changing the width of an area to which the bias voltage is applied while using an acoustic lens of a fixed characteristic to thereby obtain a B-mode image having a high resolution perpendicular to the plane of the sectional image over a wide depth range.

As described above, according to an ultrasonic imaging system which comprises the transducer which includes an electrostrictive plate and the plurality of arranged row and column electrodes, the means for specifying the position of a sectional image by applying a bias voltage to one-sided selected electrodes, and the electronic scanning means connected to the other electrodes, sectional images at positions are obtained in a short time even if the probe is not moved. Since the specifying of the sectional position is realized by control of an area in the transducer where an electro-acoustic conversion occurs, no electro-acoustic conversion occurs in an unnecessary areas. The resolution of sectional images is further improved in the particular embodiment by the combination of an acoustic lens which is moved in accordance with as position where the bias voltage is applied and control of the width of the area where the bias voltage is applied. A C-mode image or a 3-dimensional image may be formed and displayed from data on the sectional images obtained.

Figure 6A:
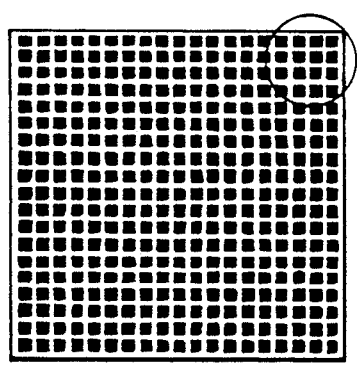
FIGS. 6A and 6B show a plan view and enlarged portion of a transducer plate used in another embodiment.
Figure 6B:
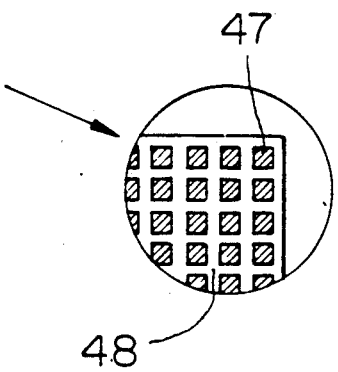

FIGS. 6A and 6B illustrate another material classified into an electrostrictive composite which may be used for the transducer plate 41. The composite include a plurality of small rectangular pillars 47 of electrostrictive ceramics and arrayed regularly in a polymer 48, for example, of polyurethane. Each pillar has a height of about 0.4 mm and a side of about 0.1 mm. The transducer plate made of electrostrictive composite has a large electrical-mechanical coupling coefficient for thickness vibration compared to a ceramic plate transducer which has a same resonant frequency. It has a reduced Q value of mechanical resonance and an improved resolution because the length of ultrasonic pulsed waves transmitted/received is reduced.

Since the acoustic impedance of an electrostrictive composite is small compared the ceramic composition, acoustic matching is attained easily. The composite is flexible and the transducer is easily formed on a curved surface. The volume percentage of the ceramic composition contained in the composite is selected so as to have an appropriate value to thereby reduce the overall dielectric constant and hence facilitate the impedance matching of the ultrasonic pulse transmitting/receiving circuit. By plating copper on both surfaces of a sheet of an electrostrictive composite, electrodes similar to those in the first embodiment are formed. By using the resulting product as a transducer plate, a probe having a structure similar to that of the probe in the first embodiment is obtained. If a section in the direction of row extension is a convex type transducer, the individual B-mode images obtained by linear scanning have the form of a sector to thereby obtain an image of a wide visual field using a small probe. If a section in the direction of column extension is a convex type transducer, a plurality of sectional images which are not parallel to each other are obtained.

we claim:
1. An ultrasonic imaging system comprising:
an ultrasonic transducer which includes a transducer plate including an electrostrictive material in which piezoelectricity is induced by a bias electric field applied thereacross, a first plurality of line electrodes provided on one surface of the plate and a second plurality of line electrodes crossing the first plurality of line electrodes on the other surface thereof;
a position selector for selecting adjacent ones of the first plurality of line electrodes, for applying a bias potential to the selected electrodes simultaneously, and for connecting nonselected electrodes to a ground potential so as to select one of a plurality of positions on the transducer plate arranged widthwise of the first plurality of line electrodes;
electronic B-mode image scanning means for repeatedly transmitting/receiving at least one ultrasonic pulse conforming to a focused ultrasound beam shifted sequentially widthwise of the second plurality of line electrodes or steered over an azimuth for a sector by using at least a part of the second plurality of line electrodes;
signal storage means for collecting and storing data on a plurality of sectional images in respective storage areas thereof, each of the sectional images corresponding to a respective one of the plurality of positions;
display means for displaying one of the plurality of sectional images; and
control means for controlling the position selector so as to periodically shift the selection of the first plurality of line electrodes in a first operating mode and to fix the selection according to a designation inputted from an input console in a second operating mode, and for controlling the signal storage means so as to deliver data stored in one of the storage areas designated from the input console to the display means.

2. An ultrasonic imaging system according to claim 1, wherein the position selected by the position selector is fixed during cyclic scanning of the ultrasonic beam by the electronic, B-mode image scanning means.

3. An ultrasonic imaging system according to claim 1, further including means for stopping, at substantially a central position of the ultrasonic transducer, the shift of the position of the selection by the position selector.

4. An ultrasonic imaging system according to claim 1, wherein the position selector sequentially alters the number of electrodes selected simultaneously at the same selective position.

5. An ultrasonic imaging system comprising:
an ultrasonic transducer which includes a transducer plate including an electrostrictive material in which piezoelectricity is induced by a bias electric field applied thereacross, a first plurality of line electrodes provided on one surface of the plate and a second plurality of line electrodes crossing the first plurality of line electrodes on the other surface thereof;
a position selector for selecting adjacent ones of the first plurality of line electrodes of the transducer for applying a bias voltage to the selected electrodes simultaneously, and for shifting the position of the selection periodically;

electronic B-mode image scanning means for repeatedly transmitting/receiving at least one ultrasonic pulse conforming to a focused ultrasound beam shifted sequentially widthwise of the second plurality of line electrodes or steered over an azimuth for a sector by using at least part of the second plurality of line electrodes of the transducer;

signal storage means for collecting and recording echo signals indicative of data on sectional images at positions corresponding to the positions selected by the position selector;

an acoustic lens having a width sufficient to cover an area of the first plurality of line electrodes to which the bias voltage is applied simultaneously by the position selector for focusing an ultrasonic wave widthwise of the first plurality of line electrodes; and means for moving the position of the acoustic lens synchronously with the shift of the position of the selection by the position selector.

6. An ultrasonic imaging system according to claim 1, wherein the transducer plate is made of a ceramic ferroelectric relaxor having a paraelectric ferroelectric transition temperature in the vicinity of room temperature.

7. An ultrasonic-imaging system according to claim 1, wherein the transducer plate is made of a ceramic material including a Pb $(Mg_{1/3}Nb_{2/3})$ $O_3$—$PbTiO_3$ solid solution system.

8. An ultrasonic imaging system according to claim 1, wherein the transducer plate is made of a composite material of a polymer and an electrostrictive ceramic material.

9. An ultrasonic imaging system comprising:
an ultrasonic transducer which includes a transducer plate made of an electrostrictive material in which piezoelectricity is induced by a bias electric field applied thereto, a first plurality of line electrodes provided on one surface of the plate and a second plurality of line electrodes provided so as to cross the first plurality of line electrodes on the other surface thereof;

a first position selector for applying a bias voltage selectively to adjacent ones of the first plurality of line electrodes of the transducer and for shifting the position of the selection periodically;

a second position selector for selecting adjacent ones of the second plurality of line electrodes and for shifting the position of the selection periodically;

a transmission signal generator for generating a transmission signal periodically to drive the transducer to thereby generate a pulsed ultrasonic wave and delivering the transmission signal to the electrodes selected by the second position selector;

a beam former for performing electronic focusing of echo signals under predetermined reception beam characteristics from received signals obtained from the electrodes selected by the second position selector;

signal storage means having a plurality of storage areas corresponding to the positions of selection by the first position selector for storing echo signals, obtained sequentially from the beam former, in the corresponding storage areas to thereby collect and record data on sectional images;

an acoustic lens having a width sufficient to cover an area of the first plurality of line electrodes to which the bias voltage is applied simultaneously by the first position selector for focusing an ultrasonic wave widthwise of the first plurality of line electrodes; and means for moving the position of the acoustic lens synchronously with the shift of the position of the selection by the first position selector.

* * * * *